INVENTOR.
SAMUEL G. LUTZ,
BY
Noel B. Hammond
AGENT.

INVENTOR.
SAMUEL G. LUTZ,
BY
Noel B. Hammond
AGENT.

INVENTOR.
SAMUEL G. LUTZ,
BY
Noel B. Hammond
AGENT.

INFORMATION TRANSLATION DEVICE

INVENTOR.
SAMUEL G. LUTZ,
BY
Noel B. Hammond
AGENT.

INVENTOR.
SAMUEL G. LUTZ,
BY
Noel B. Hammond
AGENT

Aug. 10, 1965 S. G. LUTZ 3,200,375

KEYBOARD FOR CONTROLLING SIGNAL GENERATOR HAVING MEANS FOR CHANGING KEY DESIGNATIONS

Filed Sept. 5, 1961

8 Sheets-Sheet 6

INVENTOR.
SAMUEL G. LUTZ,
BY
Noel B. Hammond
AGENT.

INVENTOR
SAMUEL G. LUTZ,
BY
Noel B. Hammond
AGENT

Aug. 10, 1965 S. G. LUTZ 3,200,375

KEYBOARD FOR CONTROLLING SIGNAL GENERATOR HAVING MEANS FOR CHANGING KEY DESIGNATIONS

Filed Sept. 5, 1961 8 Sheets-Sheet 8

SEQUENCE CONTROL CIRCUIT 26

INVENTOR.
SAMUEL G. LUTZ,
BY
Noel B. Hammond
AGENT.

3,200,375

KEYBOARD FOR CONTROLLING SIGNAL GENERATOR HAVING MEANS FOR CHANGING KEY DESIGNATIONS

Samuel G. Lutz, Los Angeles, Calif., assignor to Hughes Aircraft Company, Culver City, Calif., a corporation of Delaware Filed Sept. 5, 1961, Ser. No. 135,935
10 Claims. (Cl. 340—147)

The present invention relates to devices for translating information into coded electrical signals and, more particularly, to a manual keyboard having changing key designations that provide a choice of message types and a choice of message portions in a predetermined order as selections are sequentially made.

The use of electrical and electromechanical apparatus such as high speed communication equipment, high speed computers and automatic manufacturing machinery often requires that information be translated into the form of electrical signals. This is usually accomplished by the utilization of such manually operated devices as telegraph keys, teletypewriters, paper tape perforators, card punching machines and magnetic recording machines. Most of these devices require that a keyboard be utilized to sequentially translate unitary elements of the information being processed. Often, the operator must also make certain translations mentally or with a code book prior to putting the information into the form of electrical signals. Some keyboards provide a vast array of keys or buttons providing different information choices.

A disadvantage of most manually operated devices for translating information into electrical signals is that the operator must be highly skilled or well trained. Otherwise, the translation is accomplished very slowly and with many errors. Furthermore, even with an efficient operator, the translation process requires an excessive amount of time because of the necessity of translating each unitary element of information in sequence. That is, each word or message must be spelled out letter-by-letter or character-by-character.

Much information is easily anticipatable because it is constrained to patterns or sequences and is often highly redundant. That is, many messages are similar in form and may be classified into groups of message types. Furthermore, in each type of message the order of appearance of particular types of information often may be classified into a particular sequential pattern. Additionally, some information in a message may actually be superfluous or repetitious.

Thus, it is highly desirable in the use of present-day, high speed electrical and electromechanical apparatus to employ an efficient device for translating information into the form of elertrical signals. A truly efficient device should be usable by an unskilled operator and yet should permit a message to be translated rapidly. The device should display only a few choices for selection at any one time and should not require the use of mental translations or a code book. In addition, the device should not require each message to be spelled out letter-by-letter or character-by-character but rather should take advantage of the anticipatable features of the information.

Accordingly, it is an object of the present invention to provide a device for translating information into electrical signals that is usable by an unskilled operator.

Another object of the invention is the provision of an information translation device that encodes messages in a relatively short time.

Yet another object of the present invention is to provide an information translation device that provides a step-by-step choice of predetermined partial messages that when selected form a complete message.

A further object of the invention is the provision of an information translation device that presents partial message choices to the operator in preselected sequences.

In accordance with these and other objects of the invention, a group of keys arranged in a keyboard provides different coded electrical output signals in response to the manual operation of different ones of the keys. The keys are provided with visual designations forming partial messages. The visual designations of the keys change as a group, after each selection, to provide successive partial message selections forming a complete message. The first selection controls the particular sequence of designations that is provided for subsequent sucessive selections. Thus, successive manual operation of the same key, although providing the same electrical output signal, has different meanings. The electrical output signals are transmitted to a decoding device that interprets the electrical signals according to the coding and according to the position of the signals in the sequence.

The following specification and the accompanying drawings respectively describe and illustrate an exemplification of the present invention. Consideration of the specification and the drawings will provide a complete understanding of the invention, including the novel features and objects thereof. Like reference characters are used to designate like parts throughout the figures of the drawings.

Figure 1:
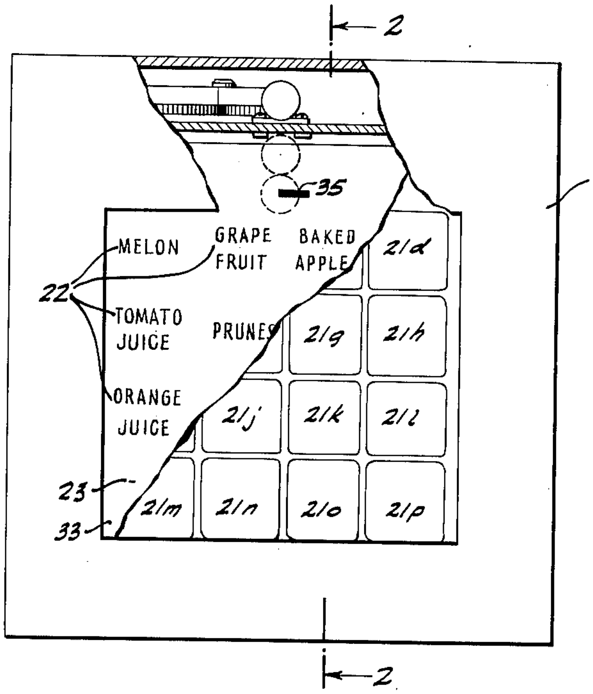
FIG. 1 is a partly cut away plan view of an exemplary embodiment of a device for translating information into electrical signals in accordance with the present invention and showing a keyboard having a key designation tape thereover.

The present invention is embodied in an exemplary device for translating information into electrical signals illustrated in FIG. 1 and having a manual selection arrangement such as a keyboard 20 provided with a plurality of selection members such as pushbuttons or keys 21. The information translation device provides different coded electrical output signals in response to the manual operation of different ones of the keys 21. The keys 21 are provided with changeable visual designations 22 that are, in the present example, printed in a series of frames on a roll chart or tape 23 movably disposed over the keys 21. Each of the frames is adapted to overlay the keyboard 20 and after a selection is made in a given frame by pressing the tape 23 over one of the keys 21, a different frame of the tape 23 is positioned over the keyboard 20 in a manner hereinafter to be described.

Figure 6:
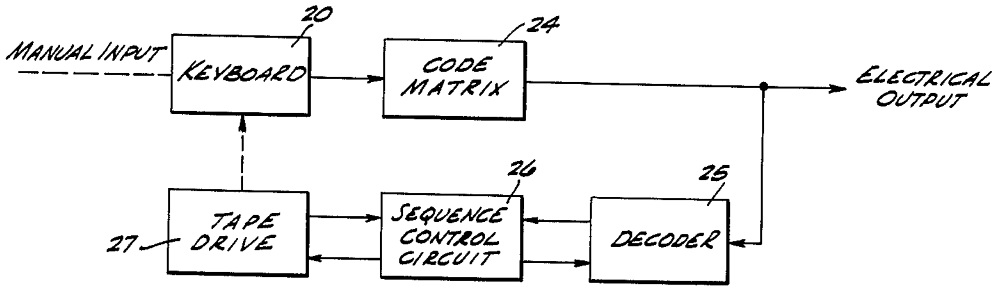
FIG. 6 is a block diagram of the circuit of the exemplary embodiment of the information translation device in accordance with the present invention.

Manual operation of the keys 21 on the keyboard 20 develops coded electrical signals by means of the circuit shown in the block diagram of FIG. 6. Depression of any key 21 applies a simple electrical signal to a code matrix 24 that converts the signal from each key 21 into a different binary-coded electrical output signal. A decoder 25 develops a signal indicating which sequence was selected and applies the signal to a sequence control circuit 26 that, in conjunction with a tape drive 27, controls the positioning of the tape 23 to successive frames of the selected sequence as successive selections are made on the keyboard 20 until the message is completed.

Referring again to FIG. 1, the keyboard 20 is provided with, in the present example, 16 keys 21 arranged in a 4 x 4 array, although any number may be used. However, in accordance with the present invention, the use of a large number of keys 21 is not necessary because the designation 22 associated with the keys 21 may be changed many times. Regardless of the number of keys 21 provided, a rectangular grouping of the keys 21 will generally be found preferable. The use of fewer keys 21, for example four or eight, leads to more rapid selection but to larger sequences and greater divergence of selections. More keys 21, for example 32 or even 64, provides greater freedom of selection with less divergence, but increases the time required for selection and the opportunity for error in selecting the correct key 21.

Although the changeable designations 22 for the keys 21 may, in accordance with the present invention, be formed by many different methods, as by projection from microfilm, the designations 22 are, in the present example, printed on the aforementioned roll chart or tape 23. The tape 23 extends over the keyboard 20 and is protected from the operator's finger by a flexible, transparent diaphragm or window 33 which may be made of "Mylar," for example. The operator merely presses this window 33 over the desired designation 22 and this pressure, through the window 33 and tape 23, actuates the key 21. If desired, the key 21 may be illuminated by an internal lamp after actuation to indicate that the correct key 21 has been actuated.

Figure 3:
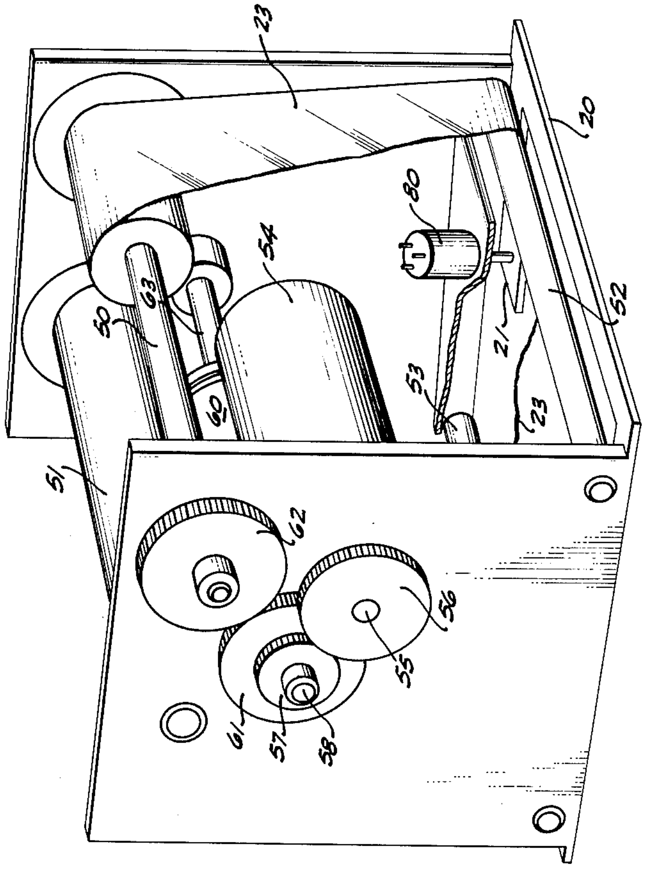
FIG. 3 is an inverted perspective view of the interior of the information translation device of FIGS. 1 and 2 with the keyboard on the bottom and showing a drive mechanism for positioning the tape.
Figure 4:
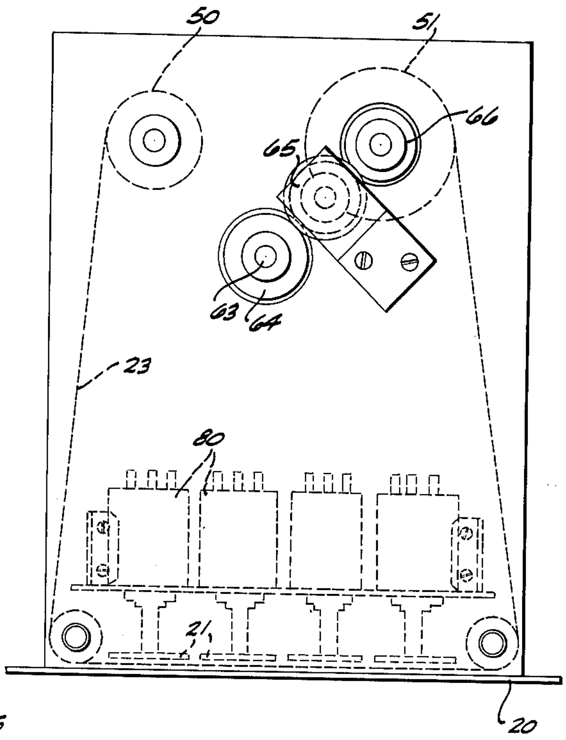
FIG. 4 is an inverted elevational view of the translation device of FIGS. 1–3, also having the keyboard on the bottom, and showing the relationship of the keyboard, the tape and the tape drive mechanism.

As may be seen in FIGS. 3 and 4, each of the keys 21 is mechanically coupled to an electrical switch 80 disposed beneath the keyboard 20. It should be noted that FIGS. 3 and 4 are inverted with respect to FIG. 1 and have the keyboard 20 at the bottom for clarity. The switches 80 are of the snap-action type that make an audible sound when actuated and also make a "click" that can be felt by the operator.

It will be apparent that other and different switching arrangements may be used, if desired. For example, the keys 21 may be interlocked so that only one key 21 can be depressed at a time. In place of the switches 80, an arrangement of cams and microswitches may be employed or a coding drum having contact patterns that wipe across contact brushes may be utilized.

Figure 5:
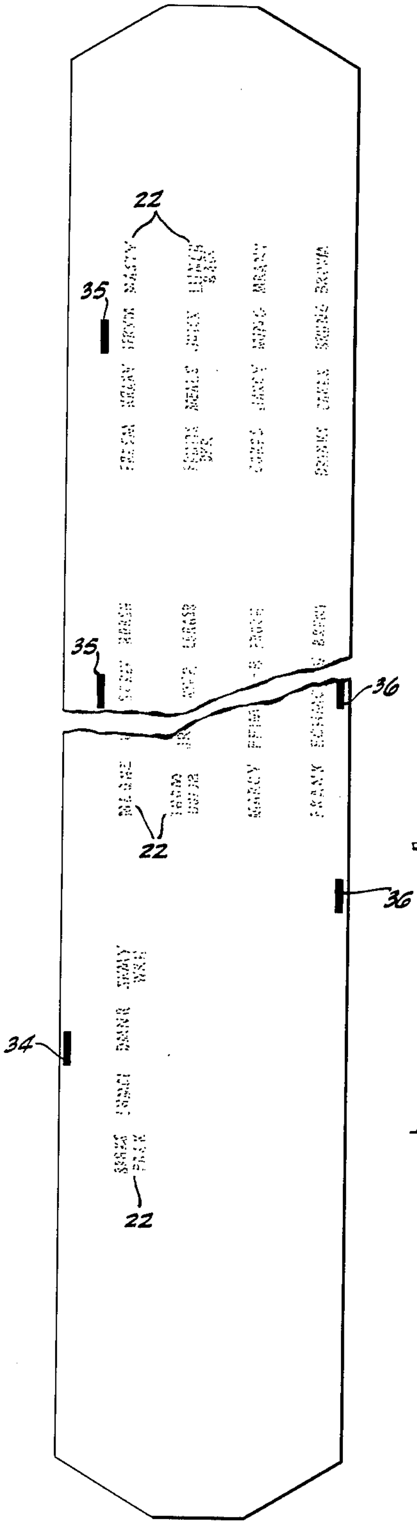
FIG. 5 is a broken plan view of the tape used in the translation device of FIGS. 1–4 illustrating the arrangement of the key designations in frames.

The tape 23 is made of a flexible, translucent material such as "Mylar" and may be of any length desired. In the present example, the tape 23 is provided with ten groups or frames of designations 22, each being adapted to overlay or register with the keyboard 20 as shown in FIGS. 1 and 5. The designations 22 are applied to the tape 23 by printing or painting and may consist of single words, phrases, numerals, pictures or symbols. Thus, any expedient that facilitates interpretation and accurate selection of the correct key 21 may be employed, including color coding and use of silhouettes of ships or other objects. Before applying the designations 22 to the tape 23, the information to be translated is analyzed. All anticipatable and reasonably probable messages (or control functions) are classified into a suitable number of categories or message types. Some may be combined with others or dispensed with altogether to keep within the limit imposed by the available or desired number of keys 21. Having established the message types, each is considered as a sequence of information selections, suitable in number and with each selection being from among a suitable number of choices so as not to require an excessive length of tape 23 which results in excessive travel time of the tape 23.

To illustrate how the information to be translated may be organized as sequences of changing key designations 22, an example of orders for food such as might be made in a restaurant is described. It is to be expressly understood that this example is described for purposes of illustration only. As mentioned hereinbefore, the tape 23 in this example has ten frames of designations 22. The first or index frame presents a choice of message type which determines the number and sequence of frames that follow. The first frame, illustrated in FIG. 5, presents a choice of four types of messages, which may be, for example, breakfast, lunch, dinner, and snack. The breakfast sequence comprises frames 2, 3 and 4. Frame 2, partially illustrated in FIGS. 1 and 5, presents a choice of appetizers as, for example, melon, grapefruit, baked apple, orange juice, tomato juice, prunes, etc. Frame 3 presents a choice of the main dish as, for example, eggs, pancakes, French toast, waffle, etc.; and frame 4 presents a choice of the side dish as, for example, sausage, bacon, ham, grits, potatoes, etc.

The lunch sequence comprises frames 5 and 6. Frame 5 presents a choice of sandwiches as, for example, hamburger, ham, cheese, pastrami, hot dog, etc. Frame 6 presents a choice of beverages as cola, coffee, milk, iced tea, lemonade, malt, etc.

The dinner sequence comprises frames 7, 8 and 9. Frame 7 presents a choice of appetizers such as salad, soup, juice, etc. Frame 8 presents a choice of entrees such as roast beef, steak, pork chop, etc. Frame 9, partially illustrated in FIG. 5, presents a choice of dessert, such as pie, cake, ice cream, etc. The snack sequence comprises frame 10, illustrated in FIG. 5, which presents a choice of snacks such as ice cream sundae, French pastry, etc.

FIGS. 3 and 4 illustrate the mechanism for transporting or driving the tape 23. Referring particularly to FIG. 3, a pair of spools 50 and 51 are rotatably fastened below the keyboard 20. One end of the tape 23 is secured to the first spool 50 and the other end of the tape 23 is secured to the second spool 51. A pair of rollers 52 and 53 are rotatably disposed adjacent opposite edges of the keyboard 20. The tape 23 extends from the first spool 50 to the first roller 52, across the keys 21 of the keyboard 20 and beneath the window 33 to the second roller 53, and then to the second spool 51. With this arrangement, the tape 23 may be freely transported back and forth across the keyboard 20 by rotation of the spools 50 and 51. A source of motive power such as an electric motor 54 is disposed beneath the keyboard 20 and its shaft 55 rotates continuously regardless of whether the tape 23 is in motion or not. Movement of the tape 23 is controlled by an electromagnetic clutch 60 having two energizing coils. A driving gear 56 secured to the shaft 55 of the motor 54 engages an input gear 57 secured to the inner shaft 58 of a pair of concentric shafts extending from the electromagnetic clutch 60. The outer shaft of the pair of concentric shafts drives a first output gear 61 that meshes with a gear 62 connected to the first spool 50. The electromagnetic clutch 60 has a third shaft 63 extending from its opposite end.

Referring to FIG. 4, the third shaft 63 is connected to a second output gear 64 that is meshed with an idler gear 65 which is in turn meshed with a gear 66 that is connected to the second spool 51. In this manner, when the electromagnetic clutch 60 is not energized, neither one of the spools 50 or 51 is driven although the motor 54 is operating. When the first coil of the clutch 60 is energized, the first spool 50 is driven through the associated gears 61 and 62 and when the second coil of the clutch 60 is energized, the second spool 51 is driven through the associated gears 64, 65 and 66.

Other mechanisms for transporting or driving the tape 23 may also be found to be satisfactory. For example, the tape 23 may be provided with a row of perforations along the edge thereof that are engaged by a sprocket wheel. By rotating the sprocket wheel, one way or the other, the tape 23 may be moved back and forth across the keyboard 20.

To control the accurate registry or positioning of the frames of designations 22 over the keyboard 20, the tape 23 is coded on the margins. Coding indicia 34, 35 and 36 (FIGS. 1 and 5) consisting of opaque, rectangular areas, are disposed along the longitudinal edges of the translucent tape 23, one indicium 34, 35 or 36 being provided for each of the ten frames, plus an additional indicium 36 provided between the first and second frames, making a total of eleven indicia 34, 35 and 36 in all. The indicia 34, 35 and 36 may be formed by printing or painting opaque black rectangles on the tape 23. The first or index frame has its indicium 34 located in the upper margin of the tape 23 adjacent the outer edge thereof which serves as an indicator of the "home" or beginning position of the tape 23. The fourth, sixth, ninth and tenth frames, which are the last frames of the four sequences, have their indicia 35 located also in the upper margin of the tape 23 but spaced away from the outer edge of the tape toward the frames of designations 22. These indicia 35 serve as indicators that the last frame of the selected sequence has been reached, and control the resetting of the tape 23 to the first frame or home position. The second, third, fifth, seventh and eighth frames have their indicia 36 located in the lower margin of the tape adjacent the outer edge thereof. These indicia 36 indicate when any but the last frame of a selected sequence has been reached. The indicia 34, 35 and 36 associated with the ten frames of designations 22 are disposed slightly off center along the margins of the frames, that is, they are not equidistant from the sides of their respective frames. The additional indicium 36 between the first and second frames is also in the lower margin of the tape 23 and is provided for a purpose to be hereinafter described.

Figure 2:
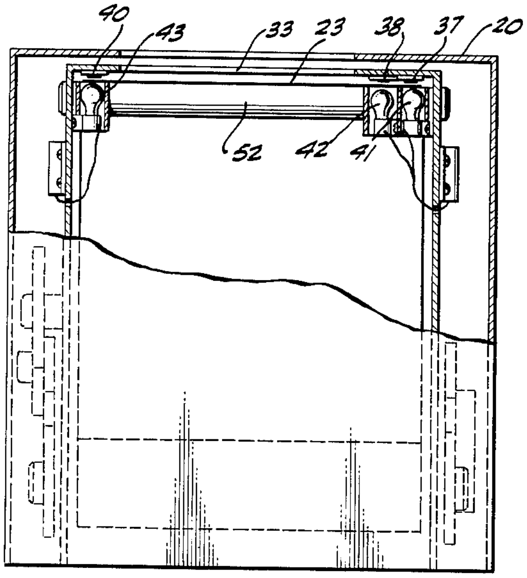
FIG. 2 is a cross sectional elevational view of the information translation device of FIG. 1 taken along the line 2—2 of FIG. 1 showing a light source and photoelectric cell arrangement for sensing the position of the tape.

During movement of the tape 23, the indicia 34, 35 and 36 interrupt light beams to provide electrical control signals. Referring to FIG. 2, a first photoconductive diode 37 is disposed adjacent the keyboard 20 and above the upper margin of the tape 23 adjacent the outer edge thereof. A second photoconductive diode 38 is also disposed adjacent the keyboard 20 and above the upper margin of the tape 23 but is displaced from the outer edge of the tape 23 toward the designations 22. A third photoconductive diode 40 is disposed adjacent the keyboard 20 above the lower margin of the tape 23. Three light sources, such as electric lamps 41, 42 and 43, are disposed adjacent the keyboard 20 below the tape 23. The first lamp 41 is directly beneath the first photoconductive diode 37; the second lamp 42 is directly beneath the second photoconductive diode 38; and the third lamp 43 is directly beneath the third photoconductive diode 40. The lamps 41, 42 and 43 are masked to provide a narrow beam of light directed onto the photoconductive diodes 37, 38 and 40, the beams of light having dilmensions such as to be easily interrupted by the indicia 34, 35, 36 during movement of the tape 23. The lamps 41, 42 and 43 are positioned along the upper and lower margins of the keyboard 20 so that the light beams are equidistant from the sides of the keyboard 20.

Other arrangements may be employed for controlling the positioning of the tape 23, if desired. For example, the margins of the tape 23 may be provided with coding holes through which spring loaded wipers make electrical contact. Another arrangement that may be employed is magnetic coding. Additionally, the coding may be between the frames instead of along the margins, if desired.

Figure 7:
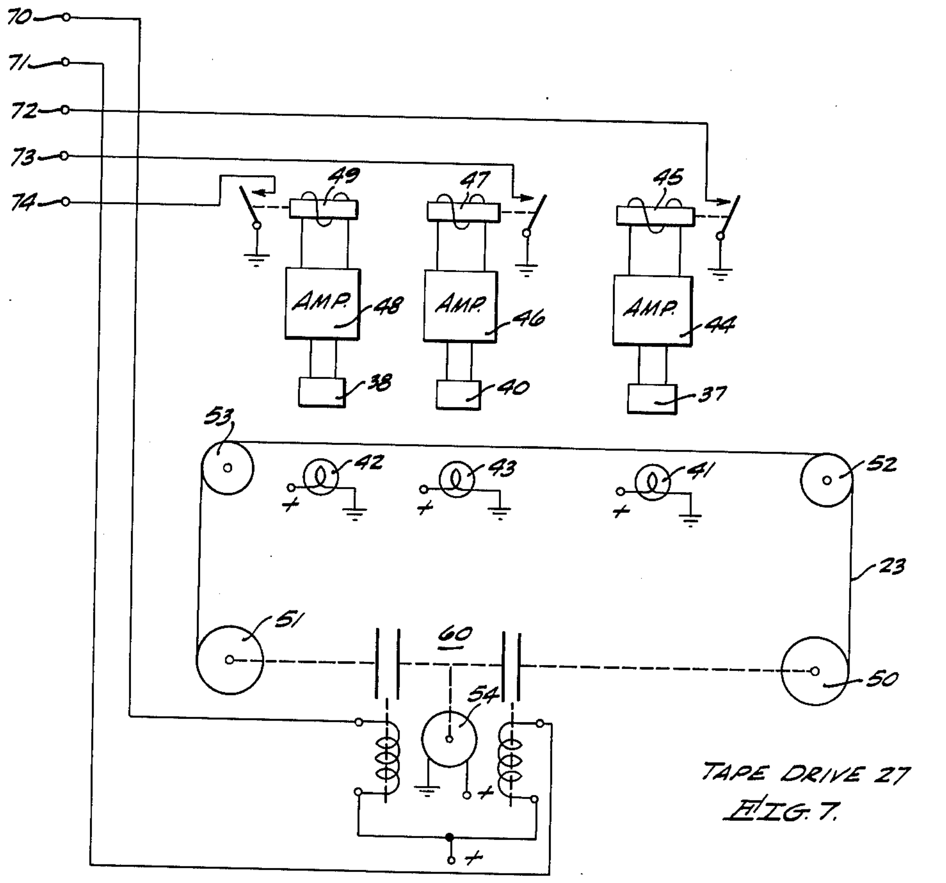
FIG. 7 is a schematic circuit diagram of the tape drive and sensing mechanism of the information translation device.

The electrical wiring diagram of the tape drive mechanism 27 is shown schematically in FIG. 7. The electric motor 54 is connected across the source of potential indicated by the symbols "ground" and "plus." One end of each of the actuating coils of the electromagnetic clutch 60 is connected to the positive terminal of the source of potential. The other end of the coil of the clutch 60 that controls movement of the tape 23 in the forward or wind direction is connected to a wind clutch terminal 70. The wind direction is the direction that moves successive frames of designations 22 over the keyboard 20 in the prescribed order for sequential selection. The remaining end of the coil of the clutch 60 that controls movement of the tape 23 in the reverse or rewind direction is connected to a rewind clutch terminal 71. The rewind direction is the direction that moves successive frames of designations 22 over the keyboard 20 in the reverse order to that for sequential selection to reposition the first or index frame over the keyboard 20. Thus, the connection of the grounded side of the source of potential to the wind clutch terminal 70 causes the tape 23 to move in the wind direction, and the connection of ground to the rewind clutch terminal 71 causes the tape 23 to move in the rewind direction.

The electric lamps 41, 42 and 43 beneath the tape 23 are each connected across the source of potential. The photoconductive diode 37 disposed above the extreme upper edge of the tape 23 is connected to the input of an amplifier 44 having an electromagnetic relay 45 connected to its output. The relay 45 has a normally open contact that is connected to the ground terminal of the source of potential on one side and connected to a home signal terminal 72 on the other side. Similarly, the photoconductive diode 40 disposed above the lower edge of the tape 23 is connected to the input of an amplifier 46 having an electromagnetic relay 47 connected to its output. The relay 47 has a normally open contact that is connected to ground on one side and connected to a wind stop signal terminal 73 on the other side. The photoconductive diode 38 disposed above the upper margin of the tape 23 but displaced away from the extreme edge thereof toward the designations 22, is also connected to the input of an amplifier 48. A relay 49 is connected to the output of the amplifier 48 and has a normally open contact that is connected to ground on one side and connected to a rewind signal terminal 74 on the other side. When the light beams are uninterrupted, as when the frames of designations 22 are centered over the keyboard 20, the relays 45, 47, 49 are not energized and the grounded side of the source of potential is disconnected from the home, wind stop and rewind signal terminals 72, 73, 74. As the tape 23 moves across the keyboard 20, the indicia 34, 35, 36 associated with the frames interrupts one of the light beams so that ground is momentarily connected to one of the signal terminals 72, 73, 74, each time one of the frames passes over the keyboard 20.

Figure 8:
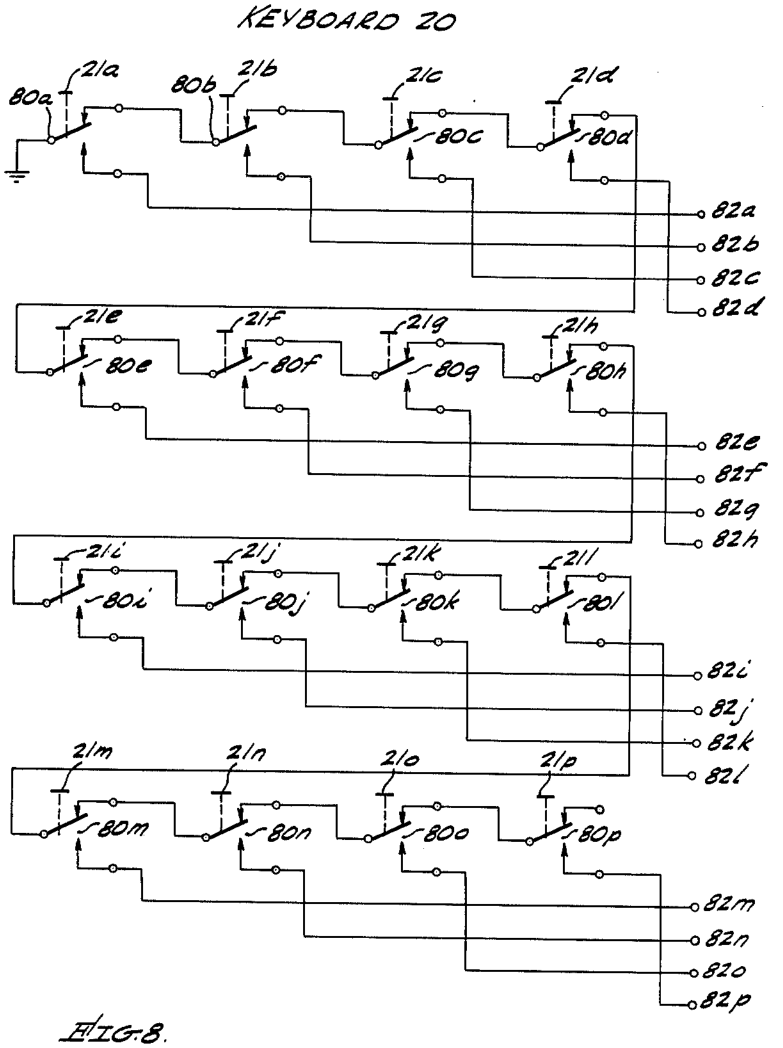
FIG. 8 is a schematic circuit diagram of the wiring of the keyboard of the translation device.

The generation of coded electrical signals corresponding to the selected information may be understood by reference to the schematic wiring diagram of the keyboard 20 shown in FIG. 8. The switches 80*a–p* associated with the keys 21*a–p* are of the single pole, double throw type having a normally open circuit and a normally closed circuit. All of the switches 80*a–p* have their normally closed circuits wired in series, one end of the series-connected normally closed circuits being connected to the ground side of the source of potential at the first switch 80*a* and the other end at the sixteenth switch 80*p* having no connection made thereto. Each of the normally open contacts of the switches 80a–p are individually brought out to separate keyboard terminals 82a–p. If any one of the switches 80a–p is actuated, the normally closed contact thereof is opened and the normally open contact is closed, which connects the associated one of the keyboard terminals 82a–p to ground. Thus, if the third key 21c is depressed, the third switch 80c is actuated, applying ground to the third keyboard terminal 82c. It may be seen that the keyboard 20 translates the information that a specific one of the keys 21a–p has been depressed into a simple electrical signal, namely, the presence of ground potential at a specific one of the keyboard terminals 82a–p.

Figure 9:
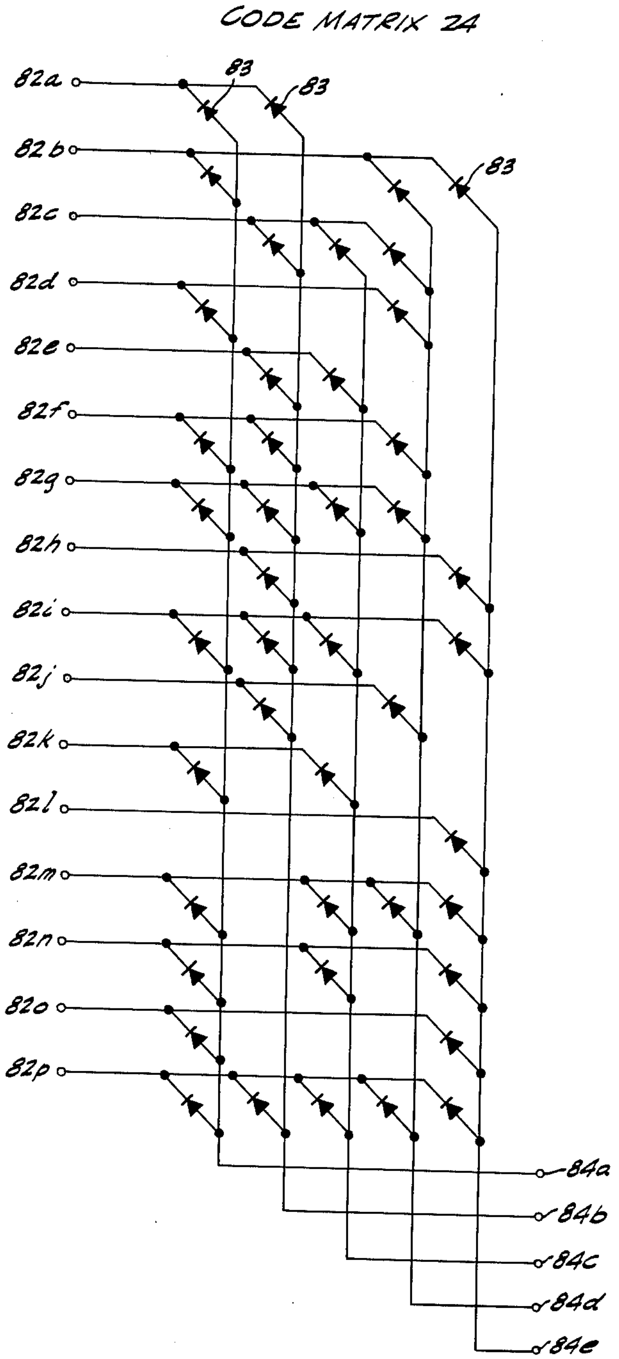
FIG. 9 is a schematic circuit diagram of the code matrix of the translation device.

Thus, the electrical signal from the keyboard 20 is coded into a 16-wire or -digit binary code, which is much more than is required to transmit the information from the 16 keys 21a–p. Accordingly, the code matrix 24 converts the 16-digit code into a five-digit code. As illustrated in FIG. 9, the keyboard terminals 82a–p are connected by a plurality of diodes 83 to five output terminals 84a–e. The cathodes of the diodes 83 are connected to the keyboard terminals 82a–p and the anodes are connected to the output terminals 84a–e. The diodes 83 connect the keyboard terminals 82a–p to the output terminals 84a–e in preselected combinations such that the presence of ground potential at a particular one of the keyboard terminals 82a–p results in the presence of ground potential at a unique combination of the output terminals 84a–e simultaneously. For example, if the first key 21a is depressed, the associated switch 80a applies ground to the first keyboard terminal 82a with the result that the ground potential appears at the first and second output terminals 84a and 84b but not at the third, fourth and fifth output terminals 84c, 84d and 84e. Thus, a distinctively coded 5-digit binary output signal is produced by the operation of the keys 21a–p. The output of terminals 84a–e of the code matrix 24 serve as the output terminals of the information translation device. The coding for the 16 keys as as follows:

| Key: | Output terminal at which ground appears |
|---|---|
| 21a | 84a, 84b |
| 21b | 84a, 84d, 84e |
| 21c | 84b, 84c, 84d |
| 21d | 84a, 84d |
| 21e | 84b, 84c |
| 21f | 84a, 84b, 84d |
| 21g | 84a, 84b, 84c, 84d |
| 21h | 84b, 84e |
| 21i | 84a, 84b, 84c, 84e |
| 21j | 84b, 84d |
| 21k | 84a, 84c |
| 21l | 84f |
| 21m | 84a, 84c, 84d, 84e |
| 21n | 84a, 84c, 84e |
| 21o | 84a, 84e |
| 21p | 84a, 84b, 84c, 84d, 84e |

The particular coding used in this example was arbitrarily selected and many other codes may be used.

Figure 10:
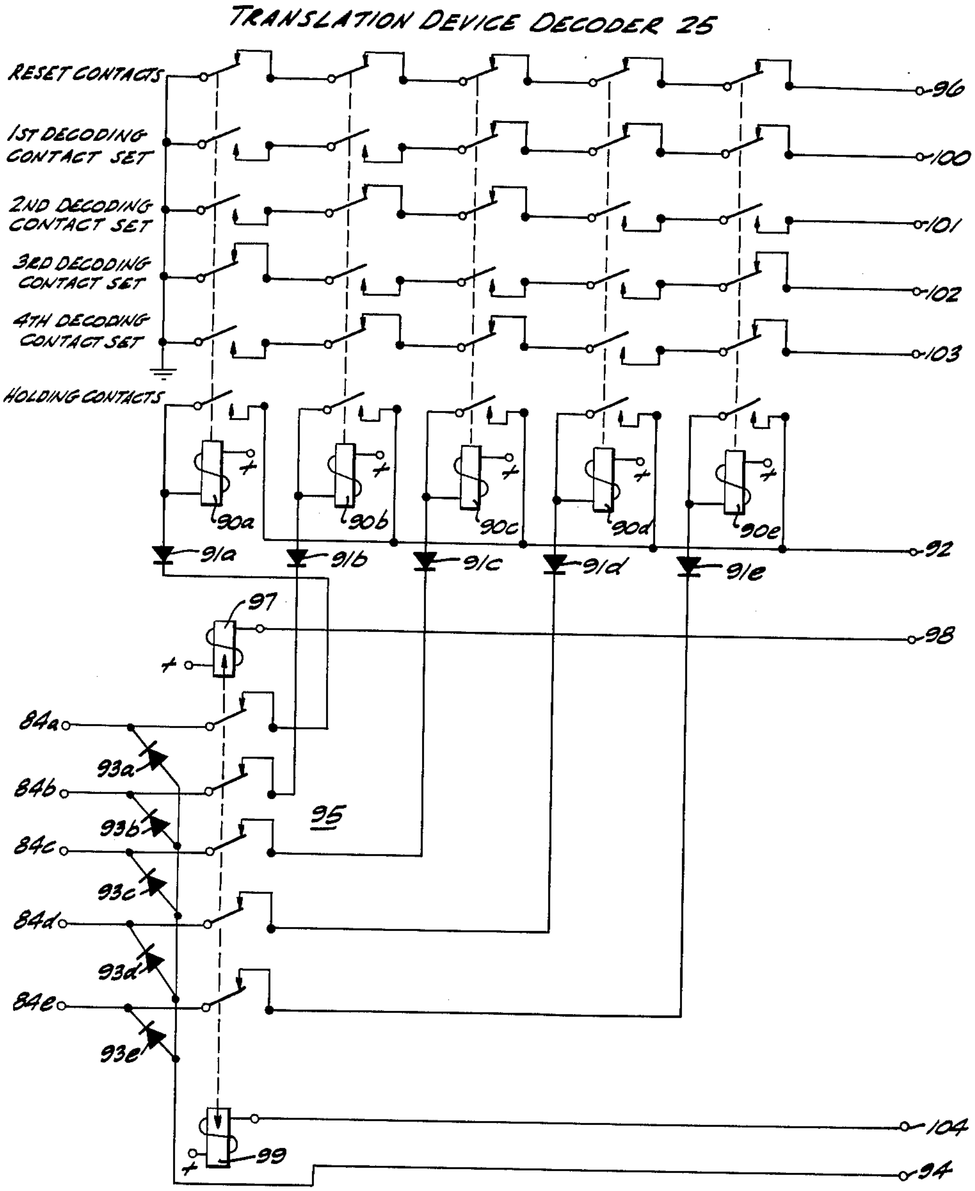
FIG. 10 is a schematic circuit diagram of the decoder of the translation device.

In addition to being transmitted to a utilization device, the coded electrical output signals appearing at the output terminals 84a–e are also applied to the decoder 25 which registers the code of the first output signal and develops a control signal indicating which of the sequences was selected. Referring now to FIG. 10, five electromagnetic relays 90a–e are provided in the decoder 25 for registering the five digits of the first coded signal. Each of the relays 90a–e has one side of its coil connected to the positive terminal of the source of potential. The other side of the coils of the five relays 90a–e are separately connected through associated diodes 91a–e to individual contacts on a latching relay 95 which, when closed, connect each of the coils to a different one of the output terminals 84a–e of the code matrix 24. Specifically, the other end of the coil on the first relay 90a is connected to the anode of the first diode 91a. The cathode of the first diode 91a is connected to one side of the first set of contacts of the latching relay 95. The other side of the first set of contacts is connected to the first output terminals 84a. Similarly, the remaining end of the coil of the second relay 90b is connected through the second diode 91b to one side of the second set of contacts on the latching relay 95, the other side of the contacts being connected to the second output terminal 84b. In like fashion, the remaining ends of the coils of the third, fourth and fifth relays 90c, 90d and 90e are each individually connected through the third, fourth and fifth diodes 91c, 91d and 91e, respectively, to one side of the third, fourth and fifth sets of contacts, respectively, on the latching relay 95, the other side of the contacts each being individually connected to the third, fourth and fifth output terminals 84c, 84d and 84e, respectively.

Each of the five relays 90a–90e has a first set of normally open contacts that are connected to form holding or self-locking circuits. One side of each of the first sets of contacts is connected to a holding ground terminal 92. The other side of the first set of contacts of the first relay 90a is connected to the coil of the first relay 90a at the end that is also connected to the first diode 91a. Similarly, the other side of the first sets of contacts of the second, third, fourth and fifth relays 90b–90c are each individually connected to the coils of the second, third, fourth and fifth relays 90b–90e, respectively, at the ends that are also connected to the second, third, fourth and fifth diodes 91b–91e, respectively.

As long as ground potential is applied to the holding ground terminal 92, any of the relays 90 a–e that are energized, causing its first set of contacts to be closed, will remain energized because the holding ground terminal 92 is connected through the first set of contacts of any energized relay 90a–e to its coil. Thus, the presence of ground potential, even momentarily, at one of the output terminals 84a–84e while the contacts of the latching relay 95 are closed causes the associated one of the relays 90a–e to operate and remain energized until the ground potential applied to the holding ground terminal 92 is interrupted.

Five diodes 93a–e individually connect the output terminals 84a–e to a key down signal terminal 94 to provide a signal that indicates when one of the keys 21a–p of the keyboard 20 has been depressed. That is, the first diode 93a connects the first output terminal 84a to the key down signal terminal 94. The second diode 93b connects the second output terminal 84b to the key down signal terminal 94 and so on. The diodes 93a–e have their cathodes connected to the output terminals 84a–84e and their anodes connected to the key down signal terminal 94. When a ground potential appears at one or more of the output terminals 84a–e, the diodes 93a–e apply the ground potential as a key down signal to the key down signal terminal 94.

The decoder 25 also provides a signal indicating which of the four message sequences was selected from the first or index frame of the tape 23 and a reset signal. This is accomplished by means of five additional sets of contacts provided on each of the relays 90a–e. Four of these additional contacts are connected to form four decoding circuits, each corresponding to the coding of the output signal produced by the actuation of one of the first four keys 21a–e of the keyboard 20. The first sets of decoding contacts of each of the relays 90a–e are connected in series to form the first decoding circuit. One end of the chain of series-connected contacts is connected to ground at the contacts of the first relay 90a. The other end of the chain of series-connected contacts is connected to a first sequence terminal 100 at the contacts of the fifth relay 90e. The first sets of decoding contacts are selected to be normally open or normally closed according to the combination that will connect ground to the first sequence terminal 100 when the first key 21*a* of the keyboard 20 is actuated. Inasmuch as actuation of the first key 21*a* results in a ground potential appearing only at the first and second output terminals 84*a* and 84*b*, only the first and second relays 90*a* and 90*b* are energized. Accordingly, the first set of decoding contacts of the first and second relays 90*a* and 90*b* are normally open contacts while the first set of decoding contacts of the third, fourth and fifth relays 90*c–e* are normally closed contacts. In this manner, only actuation of the first key 21*a* on the keyboard 20 will result in ground potential being applied to the first sequence terminal 100 by the first decoding circuit.

In a similar manner, the second sets of sequence decoding contacts of each of the relays 90*a–e* are connected in series to form the second decoding circuit. One end of the second decoding circuit is connected to ground at the contacts of the first relay 90*a* and the other end of the second decoding circuit is connected to a second sequence terminal 101 at the contacts of the fifth relay 90*e*. Inasmuch as the second decoding circuit corresponds to the coding of the second key 21*b* of the keyboard 20, the contacts of the first, fourth and fifth relays 90*a*, 90*d* and 90*e* are normally open while the contacts of the second and third relays 90*b* and 90*c* are normally closed. Thus, only actuation of the second key 21*b* of the keyboard 20 results in a ground potential being applied to the second sequence terminal 101 by the second decoding circuit.

In like manner, the third decoding circuit consists of the third set of decoding contacts connected in series between ground and a third sequence terminal 102. The contacts of the second, third and fourth relays 90*b–d* are normally open, while the contacts of the first and fifth relays 90*a* and 90*e* are normally closed. Accordingly, only actuation of the third key 21*c* of the keyboard 20 results in ground being applied to the third sequence terminal 102. Similarly, the fourth decoding circuit comprises the fourth set of decoding contacts connected in series between ground and a fourth sequence terminal 103. The contacts of the first and fourth relays 90*a* and 90*d* are normally open while the contacts of the second, third and fifth relays 90*b*, 90*c* and 90*e* are normally closed. Hence, only operation of the fourth key 21*b* on the keyboard 20 results in ground potential being applied to the fourth sequence terminal 103.

The five decoding relays 90*a*–90*e* are each provided with an additional set of normally closed decoding contacts that provide a reset signal when the five decoding relays 90*a*–90*e* are de-energized. The fifth sets of decoding contacts are also connected in a series chain, ground being connected at one end to the contacts on the first relay 90*a*, and the contacts of the fifth relay 90*e* are connected to a reset signal terminal 96. Inasmuch as these fifth sets of decoding contacts are normally closed, whenever the relays 90*a*–90*e* are de-energized, ground is applied to the reset signal terminal 96.

The decoding contacts may be connected in branches rather than in the five simple, series-connected chains of five decoding contacts described herein for clarity. That is, the contacts may be of the double-throw type and may be interconnected in a more complex branching manner to comprise what is known as relay trees so that a lesser number of contacts are required on each relay.

The latching relay 95 has a closing coil 97 which closes the contacts when momentarily energized. The contacts then remain closed after the coil 97 is de-energized. The closing coil 97 has one side connected to the positive side of the source of potential and the other side connected to a home signal terminal 98. The latching relay 95 is provided with an opening coil 99 which, when momentarily energized, opens the contacts thereof. The contacts then remain open after the coil 99 is de-energized. One side of the opening coil is connected to the positive side of the source of potential and the other side is connected to a wind stop signal terminal 104.

Figure 11:
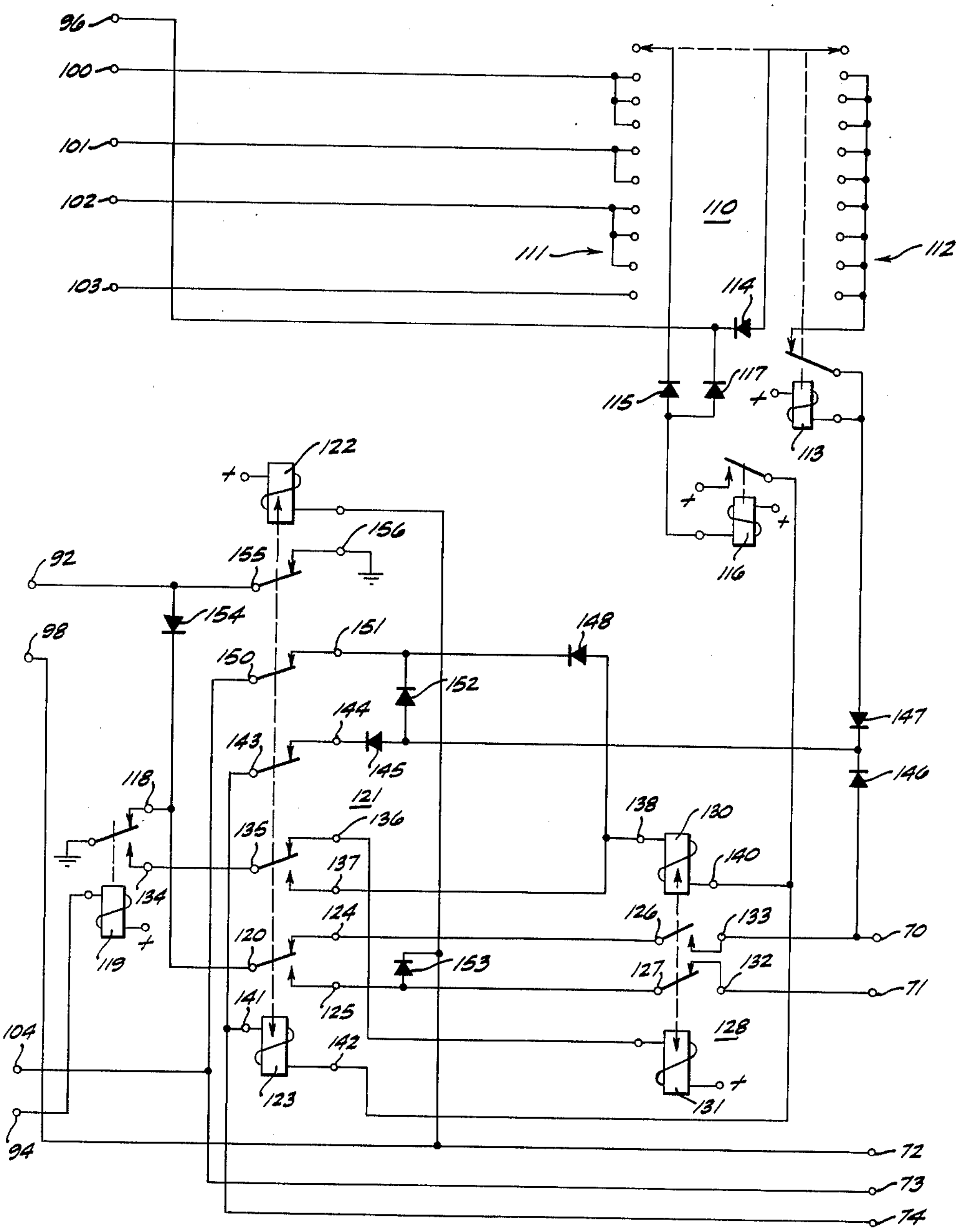
FIG. 11 is a schematic circuit diagram of the sequence control circuit of the translation device.

The sequence control circuit 26 controls the positioning of the frames of the tape 23. Referring now to FIG. 11, a rotary stepping switch 110 is provided having two banks of contacts 111, 112. The wipers of the stepping switch 110 are operated by an actuating coil 113. Each of the banks of contacts 111, 112 has ten contacts corresponding to the ten frames of designations 22 on the tape 23. The first bank of contacts 111 controls the stopping of the tape 23 on the frames of the selected one of the four sequences. Hence, the sequence terminals 100–103 of the decoder 25 are connected to the contacts of the first bank of contacts 111 on the stepping switch 110 corresponding to the frames of the four sequences. The first sequence terminal 100 is connected to the second, third and fourth contacts of the first bank of contacts because the second, third and fourth contacts correspond to the second, third and fourth frames of the tape 23 which comprises the first message sequence. In a similar manner, the second sequence terminal 101 of the decoder 25 is connected to the fifth and sixth contacts of the first bank of contacts 111. The third sequence terminal 102 is connected to the seventh, eighth and ninth contacts, and a fourth sequence terminal 103 is connected to the tenth contact of the first bank of contacts 111. The first contact of the first bank of contacts 111 has no connection made thereto.

The second bank of contacts 112 of the stepping switch 110 controls the resetting of the stepping switch 110 back to the first or home position. Accordingly, all of the contacts of the second bank of contacts 112 except the first contact, that is, contacts 2–9, are connected together. No connection is made to the first contact. The stepping switch 110 is also provided with a set of normally closed relay type contacts that are momentarily opened each time the stepping switch 110 is energized. The second through ninth contacts of the second bank of contacts 112 are connected to one side of this set of normally closed contacts. The other side of the set of normally closed contacts is connected to one side of the coil 113 of the stepping switch 110. The other side of the coil 113 is connected to the positive side of the source of potential.

The reset terminal 96 of the decoder 25 is connected to the cathode of a diode 114, the anode thereof being connected to the wiper of the second bank of contacts 112, of the stepping switch 110. The wiper of the first bank of contacts 111 of the stepping switch 110 is connected to the cathode of a second diode 115, the anode of which is connected to one end of the coil of a skip relay 116. The reset signal terminal 96 is also connected to the cathode of another diode 117, the anode thereof being connected to the end of the coil of the skip relay 116 to which the anode of the other diode 115 is connected. The remaining end of the coil of the skip relay 116 is connected to the positive terminal of the source of potential. The skip relay 116 is provided with a set of normally open contacts, one side of which is connected to the positive terminal of the source of potential.

The key down signal terminal 94 of the decoder 25 is connected to one end of the coil of a key down relay 119, the other end of the coil being connected to the positive terminal of the source of potential. The key down relay 119 is provided with a contact arm which is connected to ground and a normally closed contact 118 which is connected to a first contact arm 120 on a rewind latching relay 121. The rewind relay 121 is provided with a first coil 122 that, when energized, moves the first contact arm 120 into a first or rewind stop position where it is connected to a first contact 124. After the coil 122 is de-energized, the first contact arm 120 remains in this first position. The rewind relay 121 is provided with a second coil 123 that, when energized, moves the first contact arm 120 to a second or rewind preset position where it is connected to a second contact 125, the first contact arm 120 remaining in the second position after the second coil 123 is de-energized.

The first and second contacts 124 and 125 associated with the first contact arm 120 are each individually connected to first and second contact arms 126 and 127 on a wind latching relay 128. The wind relay 128 is provided with a first coil 130 that, when momentarily energized, moves the first and second contact arms 126 and 127 into a first or wind stop position where they remain after the first coil 130 is deenergized. The wind relay 128 is provided with a second coil 131 which, when momentarily energized, moves the first and second contact arms 126 and 127 to a second, or wind preset position where they remain after the second coil 131 is deenergized. In the first position, the first contact arm 126 is disconnected from an associated contact 133 and the second contact arm 127 is connected to an associated contact 132. In the second position, the first contact arm 126 is connected to its associated contact 133 and the second contact arm 127 is disconnected from its associated contact 132. The contact 133 associated with the first contact arm 126 is connected to the wind clutch terminal 70 of the tape drive 27, and the contact 132 associated with the second contact arm 127 is connected to the rewind clutch terminal 71.

The key down relay 119 is also provided with a normally open contact 134 that is connected to a second contact arm 135 on the rewind relay 121. In the first position, the second contact arm 135 connects to a first contact 136 and in the second position, the second contact arm 135 connects to a second contact 137. The first contact 136 is connected to one side of the second coil 131 of the wind relay 128. The other side of the second coil 131 is connected to the positive terminal of the source of potential. The second contact 137 is connected to a first terminal 138 of the first coil 130 of the wind relay 128. The second terminal 140 of the coil 130 is connected to the normally open contact of the skip relay 116.

The rewind signal terminal 74 of the tape drive 27 is connected to a first terminal 141 of the second coil 123 of the rewind relay 121. The second terminal 142 of the coil 123 is connected to the normally open contact of the skip relay 116. The rewind signal terminal 74 is also connected to a third contact arm 143 on the rewind relay 121. In the first position, the third contact arm 143 is connected to a contact 144 which is wired to the cathode of a diode 145, the anode thereof being joined to the cathodes of first and second additional diodes 146 and 147. The anode of the first of these additional diodes 146 is connected to the wind clutch terminal 70, while the anode of the second of the additional diodes 147 is connected to the actuating coil 113 of the stepping switch 110 and through the normally closed contact thereon to contacts 2–9 of the second bank of contacts 112.

The wind stop signal terminal 73 of the tape drive 27 is connected to the wind stop signal terminal 104 of the decoder 25 and is also connected to a fourth contact arm 150 on the rewind relay 121. In the first position, the fourth contact arm 150 is connected to a contact 151 which is wired to the cathode of a diode 148, the anode thereof being connected to the first terminal 138 of the first coil 130 of the wind relay 128. Additionally, the contact 151 is also connected to the cathode of another diode 152, the anode thereof being joined to the cathodes of the first and second aforementioned diodes 146 and 147.

The home signal terminal 72 of the tape drive 27 is connected to the home signal terminal 98 of the decoder 25 and to one side of the first coil 122 of the rewind relay 121. The other side of the first coil 122 is connected to the positive terminal of the source of potential. In addition, the home signal terminal 72 is also connected to the cathode of a diode 153, the anode thereof being connected to the second contact arm 127 of the wind relay 128.

The normally closed contact 118 of the key down relay 119 is connected to the cathode of a diode 154 whose anode is connected to the holding ground terminal 92 of the decoder 25. In addition, a fifth contact arm 155 on the rewind relay 121 is also connected to the holding ground terminal 92. In the first position, the fifth contact arm 155 connects to a contact 156 that is grounded.

Initially, the keys 21*a–p* of the keyboard 20 (FIG. 8) are in their normal or unactuated condition and no ground signal is present at the keyboard terminals 82*a–p* or at the output terminals 84*a–e* of the code matrix 24 (FIG. 9). In the decoder 25 (FIG. 10), the contacts of the latching relay 95 are closed and the fine decoding relays 90*a*–90*e* are in their de-energized condition, which applies ground potential to the reset signal terminal 96. In the sequence control circuit 26 (FIG. 11), the ground potential at the reset signal terminal 96 is applied through the diode 117 to the skip relay 116 which is maintained in the energized condition thereby. The key down relay 119 is in its de-energized condition and the rewind latching relay 121 and the wind latching relay 128 are in their first positions. The fifth contact arm 155 of the rewind relay 121 applies ground potential to the holding ground terminal 92 of the decoder 25. The stepping switch 110 is in its first or home position. The tape 23 is stationary with the first frame disposed over the keyboard 20. None of the light beams are interrupted by the associated indicia 34, 35 and 36 in the margins of the tape 23 and, accordingly, the three relays 45, 47 and 49 in the tape drive 27 (FIG. 7) are in their de-energized condition.

In operation, the information translation device initially presents the first or index frame of the tape 23 for selection of the desired sequence. In the present example, four sequences are provided. If the third sequence is selected, the operator presses the window 33 over the third designation 22 on the tape 23 and this pressure through the window 33 and tape 23 actuates the third key 21*c*. This operates the third switch 80*c* of the keyboard 20 with the result that ground potential is applied to the third keyboard terminal 82*c*. The code matrix 24 applies the ground potential to the second, third, and fourth output terminals 84*b–d*. In the decoder 25, the ground potential is conducted through the closed contacts of the latching relay 95 and through the diodes 91*b–d* to the coils of the second, third and fourth decoding relays 90*b–d* which are energized and remain energized through the holding circuits established by the first set of contacts to the holding ground terminal 92. Operation of the three relays 90*b–d* applies ground potential through the third sets of sequence decoding contacts to the third sequence terminal 102. This ground potential is applied to the seventh, eighth and ninth contacts on the first bank of contacts 111 of the stepping switch 110 in the sequence control circuit 26 (FIG. 11). Actuation of the relays 90*b–d* also removes the ground potential from the reset signal terminal 96, which de-energizes the skip relay 116 in the sequence control circuit 26.

In addition, the ground potential at the second, third and fourth output terminals 84*b–d* is also applied through the three diodes 93*b–d* of the decoder 25 to the key down signal terminal 94. This ground potential energizes the coil of the key down relay 119 of the sequence control circuit 26 which connects ground through the normally open contact 134 thereof, through the second contact arm 135 of the rewind relay 121 and the associated first contact 136, to the second coil 131 of the wind relay 128, which is energized thereby. This sets the wind relay 128 into the second position to preset the circuits so that when ground is applied to the first contact arm 120 of the rewind relay 121, it will be applied to the wind clutch terminal 70.

When the operator releases the third key 21*c* of the keyboard 20, the ground potential is removed from the output terminals 84*b–d* and from the key down signal terminal 94. The key down relay 119 releases, thereby connecting ground through the normally closed contact 118, through the first contact arm 120 of the rewind relay 121 and the associated first contact 124, through the first contact arm 126 of the wind relay 128 and the associated contact 133, to the wind clutch terminal 70. This causes the tape 23 to move in the forward direction over the keyboard 20. As the tape 23 moves in the forward direction, the indicium 36 in the lower margin of the tape 23 between the first and second frames, interrupts the associated light beam to the photoconductive diode 40 which results in the associated relay 47 in the tape drive 27 applying ground potential to the wind stop signal terminal 73. This ground potential is applied to the wind stop terminal 104 in the decoder 25 which energizes the second coil 99 of the latching relay 95 to disconnect the coils of the five decoding relays 90*a*–90*e* from the output terminals 84*a–e*. The second, third and fourth decoding relays 90*b–d* remain in the energized position due to the connection of the coils through the holding contacts to the holding ground signal terminal 92 at which ground potential is present. The ground potential at the wind stop signal terminal 73 is also connected through the fourth contact arm 150 and the associated contact 151 and the diode 148 to the first terminal 138 of the first coil 130 of the wind relay 128. However, this does not energize the coil 130 because the second terminal 140 of the coil 130 is not connected to the positive terminal of the source of potential because the skip relay 116 is not energized. The ground potential from the wind stop signal terminal 73 is also applied from the contact 151 on the rewind relay 121, through the two diodes 152 and 147 to the actuating coil 113 of the stepping switch 110, energizing it. When the indicium 36 between the first and second frames has passed beyond the light beam, the ground potential is removed from the wind stop signal terminal 73 which de-energizes the stepping switch 110, causing it to advance to the second position.

As the second frame passes over the keyboard 20, the indicium 36 at the bottom of the second frame interrupts the light beam, and ground potential again appears at the wind stop signal terminal 73, again energizing the actuating coil 113 of the stepping switch 110. As the indicium 36 passes out of the light beam, ground potential is removed from the wind stop signal terminal 73, de-energizing the coil 113 of the stepping switch 110, causing it to advance to the third position. Similarly, as the indicium 36 at the bottom of the third frame passes through the light beam, the stepping switch 110 advances to the fourth position.

The indicium 35 associated with the fourth frame of designations 22 on the tape 23 is at the top of the frame rather than at the bottom. As the tape 23 moves in the forward direction and the fourth frame reaches the keyboard 20, the indicium 35 interrupts the light beam to the associated photoconductive diode 38 which results in the associated relay 49 in the tape drive 27 applying ground potential to the rewind signal terminal 74. This ground potential is applied to the first terminal 141 of the second coil 123 of the rewind relay 121. However, this does not energize the coil 123 because the second terminal 142 of the coil 123 is not connected to the positive terminal of the source of potential because the skip relay 116 is not energized. The ground potential from the rewind signal terminal 74 is also conducted through the third contact arm 143 of the rewind relay 121 and the associated contact 144, through the two diodes 145 and 147 to the actuating coil 113 of the stepping switch 110, energizing it. When the indicium 35 at the top of the fourth frame has passed beyond the light beam, the ground potential is removed from the rewind signal terminal 74 which de-energizes the stepping switch 110, causing it to advance to the fifth position. In a similar manner, as the fifth frame passes over the keyboard 20, the stepping switch 110 advances to the sixth position and as the sixth frame passes over the keyboard 20, the stepping switch 110 advances to the seventh position.

In the seventh position, the ground potential present at the third sequence terminal 102 of the decoder 25 is conducted through the seventh contact of the first bank of contacts 111 of the stepping switch 110, through the wiper and the diode 115 to the skip relay 116 which is energized thereby. The skip relay 116 connects the positive terminal of the source of potential to the second terminal 140 of the first coil 130 of the wind relay 128. As the seventh frame of the tape 23 moves over the keyboard 20, the indicium 36 below the seventh frame interrupts the light beam to again cause ground potential to appear at the wind stop signal terminal 73. The ground potential again energizes the actuating coil 113 of the stepping switch 110 by way of the fourth contact arm 150 of the rewind relay 121, the associated contact 151, and the two diodes 152 and 147. In addition, the ground potential passes from the contact 151 of the rewind relay 121 through the diode 148 to the first terminal 138 of the first coil 130 of the wind relay 128. Since the skip relay 116 has connected the positive terminal of the source of potential to the second terminal 140 of the coil 130, it is energized thereby and sets the wind relay 128 to the first position. This disconnects the contact arm 126 on the wind relay 128 from the associated contact 133 which interrupts the ground potential that is applied by the key down relay 119 through the first contact arm 120 of the rewind relay 121 to the wind clutch terminal 70. However, the tape 23 does not stop moving in the forward direction immediately because the ground potential from the wind stop terminal 73 is also applied through the diode 146 to the wind clutch terminal 70, causing the tape 23 to continue to move until the indicium 36 ceases to interrupt the light beam. When ground potential is removed from the wind stop signal terminal 73, the electromagnetic clutch 60 is de-energized, the tape 23 ceases to move, and the stepping switch 110 advances the wipers to the eighth position. This leaves the seventh frame of designations 22 centered over the keyboard 20.

Thus, selection of the third message sequence from the first frame of designations 22 by actuation and release of the third key 21*c* resulted in the movement of the tape 23 to position the seventh frame of designations 22, which is also the first frame of the selected sequence, over the keyboard 20. In addition, a coded electrical signal indicating that the third key 21*c* was actuated, appeared at the output terminals 84*a–e*.

The seventh frame on the tape 23 now presents a choice of sixteen designations 22 from which the first selection in the chosen sequence may be made. If the third designation 22 is selected, the third key 21*c* is again depressed, actuating the third switch 80*c* on the keyboard 20. Again, ground potential is applied to the third keyboard terminal 82*c*, resulting in the appearance of ground potential at the second, third and fourth output terminals 84*b–d*.

The ground potential at the second, third and fourth output terminals 84*b–d* is applied through the three diodes 93*b–d* of the decoder 25 to the key down signal terminal 94. This ground potential energizes the coil of the key down relay 119 of the sequence control circuit 26 which connects ground through the normally open contact 134 thereof, through the second contact arm 135 of the rewind relay 121 and the associated first contact 136, to the second coil 131 of the wind relay 128, which is energized thereby. This again sets the wind relay 128 into the second or wind preset position.

When the third key 21*c* of the keyboard 20 is released, the ground potential is removed from the output terminals 84*b–d* and from the key down signal terminal 94. The key down relay 119 releases, thereby connecting ground through the normally closed contact 118, through the first contact arm 120 of the rewind relay 121 and the associated first contact 124, through the first contact arm 126 of the wind relay 128 and the associated contact 133, to the wind clutch terminal 70. This causes the tape 23 to move in the forward direction over the keyboard 20. As the tape 23 moves in the forward direction, the indicium 36 in the lower margin of the tape 23 below the eighth frame interrupts the light beam to again cause ground potential to appear at the wind stop signal terminal 73. The ground potential again energizes the actuating coil 113 of the stepping switch 110 by way of the fourth contact arm 150 of the rewind relay 121, the associated contact 151, and the two diodes 152 and 147. In addition, the ground potential passes from the contact 151 of the rewind relay 121 through the diode 148 to the first terminal 138 of the first coil 130 of the wind relay 128. Inasmuch as the skip relay 116 continues to connect the positive terminal of the source of potential to the second terminal 140 of the coil 130, it is energized thereby and again sets the wind relay 128 to the first or wind stop position. This again interrupts the ground potential applied by the key down relay 119 through the first contact arm 120 of the rewind relay 121 to the wind clutch terminal 70. However, the ground potential from the wind stop terminal 73 applied through the diode 146 to the wind clutch terminal 70, causes the tape 23 to continue to move until the indicium 36 ceases to interrupt the light beam. When ground potential is removed from the wind stop signal terminal 73, the electromagnetic clutch 60 is de-energized, the tape 23 ceases to move, and the stepping switch 110 advances the wipers to the ninth position. This leaves the eighth frame of designations 22 centered over the keyboard 20.

Thus, making the first selection in the chosen sequence from the seventh frame of designations 22 by actuation and release of the third key 21*c* resulted in the movement of the tape 23 to position the eighth frame of designations 22, which is also the second frame of the selected sequence, over the keyboard 20. In addition, a coded electrical signal indicating that the third key 21*c* was actuated, appeared at the output terminals 84*a–e*.

The eighth frame on the tape 23 now presents a choice of sixteen designations 22 from which the second selection in the chosen sequence may be made. If the seventh designation 22 is selected, the seventh key 21*g* is depressed, actuating the seventh switch 80*g* on the keyboard 20. Ground potential is applied to the seventh keyboard terminal 82*g*, resulting in the appearance of ground potential at the first four output terminals 84*a–d* of the information translation device.

The ground potential at the first, second, third and fourth output terminals 84*a–d* is applied through the four diodes 93*a–d* of the decoder 25 to the key down signal terminal 94. This ground potential energizes the coil of the key down relay 119 of the sequence control circuit 26 which connects ground through the normally open contact 134 thereof, through the second contact arm 135 of the rewind relay 121 and the associated first contact 136, to the second coil 131 of the wind relay 128, which is energized thereby. This again sets the wind relay 128 into the second or wind preset position.

When the seventh key 21*g* of the keyboard 20 is released, the ground potential is removed from the output terminals 84*a–d* and from the key down signal terminal 94. The key down relay 119 releases, thereby connecting ground through the normally closed contact 118, through the first contact arm 120 of the rewind relay 121 and the associated first contact 124, through the first contact arm 126 of the wind relay 128 and the associated contact 133, to the wind clutch terminal 70. This causes the tape 23 to move in the forward direction over the keyboard 20. As the tape 23 moves in the forward direction, the indicium 35 in the upper margin of the tape 23 above the ninth frame interrupts the associated light beam to cause ground potential to appear at the rewind signal terminal 74. The ground potential energizes the actuating coil 113 of the stepping switch 110 by way of the third contact arm 143 of the rewind relay 121, the associated contact 144, and the two diodes 145 and 147. In addition, the ground potential is applied to the first terminal 141 of the first coil 123 of the rewind relay 121. Inasmuch as the skip relay 116 is connecting the positive terminal of the source of potential to the second terminal 142 of the coil 123, it is energized thereby and sets the rewind relay 121 in the second or rewind preset position. This interrupts the ground potential applied by the key down relay 119 to the wind clutch terminal 70 by opening the connection of the first contact arm 120 to the associated contact 124. The electromagnetic clutch 60 is de-energized, the tape 23 immediately stops, and the stepping switch 110 advances the wipers to the tenth position because moving the third contact arm 143 of the rewind relay 121 to the second position de-energizes the actuating coil 113 of the stepping switch 110. This breaks the ground connection from the third decode terminal 102 of the decoder 25 to the coil of the skip relay 116, de-energizing it. Additionally, the fifth contact arm 155 on the rewind relay 121 no longer connects ground to the holding ground terminal 92. However, the key down relay 119 maintains the ground potential at the holding ground terminal 92 by way of the normally closed contact 118 and the diode 154. The ninth frame of designations 22 is now centered over the keyboard 20.

Thus, making the second selection in the chosen sequence from the eighth frame of designations 22 by actuation and release of the seventh key 21*g* resulted in the movement of the tape 23 to position the ninth frame of designations 22, which is also the final frame of the selected sequence, over the keyboard 20. In addition, a coded electrical signal indicating that the seventh key 21*g* was actuated, appeared at the output terminals 84*a–e*.

The ninth frame on the tape 23 now presents a choice of sixteen designations 22 from which the third and final selection in the chosen sequence may be made. If the first designation 22 is selected, the first key 21*a* is depressed resulting in the appearance of ground potential at the first two output terminals 84*a* and 84*b*.

The ground potential at the first two output terminals 84*a* and 84*b* is applied through the two diodes 93*a* and 93*b* of the decoder 25 to the key down signal 94. This ground potential energizes the coil of the key down relay 119 of the sequence control circuit 26 which opens the connection to the normally closed contact 118, thereby removing ground potential from the holding ground terminal 92. This results in the decode relays 90*a*–90*e* resetting to their deenergized condition, removing the ground potential from the third decode terminal 102 and applying ground potential to the reset terminal 96. The ground potential at the reset terminal 96 energizes the coil of the skip relay 116 through the diode 117. In addition, the ground potential at the reset terminal 96 is also applied through the diode 114 to the wiper on the second bank of contacts 112 of the stepping switch 110. This causes the stepping switch 110 to operate in a self-stepping mode through the contacts on the second bank of contacts 112 and the normally closed relay-type contact and the coil 113, resulting in the stepping switch 110 resetting to the first or home position. The key down relay 119 connects ground potential to its normally open contact 134 where it is conducted to the second contact arm 135 of the rewind relay 121. The ground potential is applied through the contact 137 to the first terminal 138 of the first coil 130 of the wind relay 128. Inasmuch as the skip relay 116 is applying a positive potential to the second terminal 140, the coil 130 is energized and sets the wind relay 128 into the first or wind stop position.

When the first key 21*a* of the keyboard 20 is released the ground potential is removed from the output terminals 84*a* and 84*b* and from the key down signal terminal 94. The key down relay 119 releases, thereby connecting ground through the normally closed contact 118, through the first contact arm 120 of the rewind relay 121 and the associated second contact 125, through the second contact arm 127 of the wind relay 128 and the associated contact 132, to the rewind clutch terminal 71. This causes the tape 23 to move in the reverse direction over the keyboard 20. As the tape 23 moves in the reverse direction, the indicium 34 at the extreme upper margin of the tape 23 above the first frame interrupts the light beam to the associated photoconductive diode 37 which results in the associated relay 45 in the tape drive 27 applying ground potential to the home signal terminal 72. This ground potential is also applied to the home signal terminal 98 on the decoder 25 where it energizes the first coil 97 of the latching relay threin to connect the output terminals 84*a–e* to the coils of the decoding relays 90*a–e*. In addition, the ground potential at the home signal terminal 72 energizes the first coil 122 of the rewind relay 121, setting the rewind relay 121 into the first position. This interrupts the ground potential applied by the key down relay 119 through the contact arm 120 to the rewind clutch termianl 71, causing the tape 23 to stop. However, the tape 23 does not stop moving in the reverse direction immediately, because the ground potential from the home signal terminal 72 is also applied through the diode 153 and the second contact arm 127 of the wind relay 128 and the associated contact 132 to the rewind clutch terminal 71, causing the tape 23 to continue to move until the indicium 34 ceases to interrupt the light beam. When ground potential is removed from the home signal terminal 72, the electromagnetic clutch 60 is deenergized and the tape 23 ceases to move. This leaves the first frame of designations 22 centered over the keyboard 20.

Making the final selection in the chosen sequence from the ninth frame of designations 22 by actuation and release of the first key 21*a* resulted in the movement of the tape 23 to position the first frame of designations 22, which is the index frame, over the keyboard 20. In addition, a coded electrical signal indicating that the first key 21*a* was actuated appeared at the output terminals 84*a–e*. Furthermore, all of the relays and the stepping switch in the information translation device were reset to their initial condition.

Depression of any key 21 on the keyboard 20 results in a different coded electrical output signal being developed and also results in the positioning of the tape 23 to successive frames of the selected sequence as successive selections are made on the keyboard 20 until the message is completed.

The coded electrical output signals on the information translation device are applied to a utilization device which may be a display unit such as the projection type display units manufactured by the Industrial Electronic Engineers, Inc. The output signals may be decoded to be applied to these projection type display units by means of the Bina-Dec Decoder, also manufactured by the Industrial Electronic Engineers, Inc. of North Hollwood, California. If desired, the utilization device may be a teletypewriter which will accept the five wire binary coded information and print out characters corresponding to the selection made, which can then be decoded by means of a code book. Furthermore, the output signals can be applied directly to a machine controlled device or computer, for example, if desired.

Thus, there has been described an information translation device that has a group of keys arranged in a keyboard to provide different coded electrical output signals in response to the manual operation of different ones of the keys. The keys are provided with visual designations forming partial messages and these visual designations change as a group after each selection to provide successive partial message selections forming a complete message. The first selection controls the particular sequence of designations that is presented for subsequent successive selections. Thus, successive manual operation of the same key, although providing the same electrical output signal, has different meanings. The electrical output signals are transmitted to a decoding device that interprets the electrical signals according to the coding and according to the position of the signals in the sequence.

While the principles of the invention have been described in connection with specific apparatus, it is to be clearly understood that this description is made only by way of example and not as a limitation to the scope of the invention. Many modifications will occur to those skilled in the art that will not depart from the spirit of the invention. For example, it is immaterial which languages are used at the input and output. The designations can be printed in one language on the keyboard, for example, and in a different language at the display unit. Of course, it is not necessary that a display unit be utilized at all. The coded electrical signals may be applied directly to a high speed computer or automatic manufacturing machine, for example.

If desired, some of the coded electrical signals may be derived from electromechanical transducers rather than from the keyboard. For example, in a weather report, temperature, pressure and humidity may be measured by instruments that automatically provide coded electrical signals which are combined with other coded electrical signals from the keyboard to form a complete message. The keyboard would be used to translate only information that is not easily measured and coded by instruments, such as the types and formations of clouds. In this way, the inefficient operation of visually reading instruments and manually entering the information on the keyboard may be avoided.

The information translation device need not be limited to information entry for communication or processing. It also may be utilized to provide control. For example, in an aircraft communication system, the same keyboard could be used initially to select a desired communication band—high frequency, very high frequency, ultra-high frequency, or other. Next, it could be utilized to select the desired frequency channel or synthesize a new frequency, decade by decade. Then it could be utilized to select the function as, voice, radiotelegraphy, or test. If the latter function were selected, the keyboard could control an appropriate group of system tests of each unit, from power source to antenna current. Following this, the keyboard would be used to transmit the message.

In the exemplary embodiment of the invention described, only one selection is made before the designations on the keyboard are changed. However, it may be desirable in some applications to make two or more successive selections before the keyboard designations are changed. It will be understood that this modification may be made without departing from the spirit of the invention. In addition, the next frame in any sequence, although generally being the next successive frame on the tape, may be many frames down the tape. Furthermore, an auxiliary shift key may be used to double the number of choices on the keyboard by permitting each key to designate either of two things, such as either of two letters, and thus providing ability to spell out unanticipatory information.

When the keyboard is wired directly to the display unit, there may be no need for information storage to consolidate the message prior to transmission. That is, the display unit may be actuated selection by selection as described hereinbefore. However, such slow transmission may be objectionable over long circuits or with intercomplex processing systems, in which case it may be preferable to consolidate and store the selections and then transmit them all together. This consolidation and storage may be accomplished by use of perforated tape that is punched in response to the sporadic operation of the keys and then read rapidly for trasmission. Other memory or information storage devices such as shift registers may also be used. Information comes from the keyboard in parallel groups, as described hereinbefore. Serial transmission of the information signals may be required or preferred on some communication circuits. Hence, parallel to serial conversion may be provided ahead of a serial memory or following a parallel one, if desired.

Display of the signals from the information translation device may be accomplished in many different ways, for example, a keyboard having the designations on a tape may be operated in reverse and the keys may be sequentially illuminated to display each selection. However, such a display is transitory and the selections in the sequence must be remembered in order to grasp the entire message. If desired, a teletypewriter or tape printer may be used to record the code selections of a sequence. If a permanent, plain language record is required, a photograph could be made of the temporary display appearing on the message display unit each time a message appeared. However, if a computer having a magnetic tape file and a printer is available, the plain language translations for all message elements may be taped, indexed by their binary codes for message types and sequences. Hence, the message-type indicator signal then would index the tape file to the section containing the translations for the selection sequences of the specified type message. Subsequent signals in the message would index the tape file sequentially to the appropriate translations which would be read into the printer. This mode of translation and printing may also be accomplished by using a file of perforated tape belts and readers. If desired, a printer could be provided resembling a Linotype machine in that it would have a sequential coded selection of type slugs, each of which would print words, phrases, or other translations of its portion of the received message. After printing, these slugs would be fed back to their respective magazines ready for further use.

In analyzing the information and preparing the designations on the tape, it should be recognized that nonessential information need not be included. For example, when an operator must transmit estimated numbers of aircraft or other objects without the opportunity to make an accurate count, it will be found that an observer can usualy count at a glance up to six or seven objects but makes a somewhat logarithmic judgment of greater numbers. Consequently, the information translation device might present choices of numbers of aircraft, for example, as follows: one, two, three, four, five, six, eight, ten, fifteen, twenty, thirty, fifty, one hundred, two hundred, five hundred, or more. When one cannot expect three digit accuracy, it is inefficient and perhaps misleading to include insignificant decimal digits. If angular directions in degrees are to be transmitted, a circle of keys may be utilized but it may be preferable to provide a coded signal generator on an alidade shaft to insert coded signals into the message sequence automatically.

For designating map positions, the keyboard may display the map and permit the operator to point and press to locate a particular point to within one key area. He would then be provided with another choice on an enlarged map of this previously selected area and then perhaps repeat this on an enlargement of the subarea. However, such an arrangement requires that the full map must be followed by sixteen frames of times four enlargements, each of which must be followed by its sixteen frames of times sixteen enlargements, requiring a total of 273 frames on the tape. With the tape advancing at five frames per second, it would require nearly a minute to shift from the first to the last frames, which may be too time consuming.

The information translation device has been described with reference to the selection of orders for food, as for example, in a restaurant. However, this could be applied to the ordering of groceries or, could be used in the home for the advance selection of television or other programs. Furthermore, the automatic translation device has many industrial applications where information needs to be provided to machines in offices, stores, or factories and, in addition, the information translation device may be applied to air traffic control. There are many military applications for the information translation device, for example, naval brevity codes for tactical communications within a task force. Even battlefield communication for surveillance and fire control is relatively constrained and anticipatable, and the advent of battlefield computers brings its man-machine-language problems. The urgency of military communication is not merely a matter of reliability and relative priority, but relates intimately to saturation of communication facilities and the need for less redundant communication to get useful information through a restricted communication channel at much greater rates and volumes. The information translation device of the present invention provides simple coding of anticipatable information not merely of the individual letters and numbers of written language, but of information in relatively large portions, thus providing information compression.

What is claimed is:

1. A message generator comprising:

first means having a plurality of keys providing different coded output signals in response to operation of different ones of said keys;

second means associated with said keys for providing changeable visual key designations in response to applied electrical signals;

and third means coupled to said first and second means for providing said electrical signals to said second means in response to said output signals from said first means, said third means initially providing a signal to said second means in response to the initial operation of one of said keys corresponding to a selected sequence to change said key designations to the first group of designations in said selected sequence, said third means applying subsequent signals to said second means to change said key designations to successive groups of designations in said selected sequence as said keys are successively operated.

2. A digital message generation system comprising: a keyboard including a plurality of single pole, double throw, pushbutton switches each having a normally open contact and a normally closed contact, said normally closed contacts of said switches being connected in series, a fixed potential connected to one end of said serially connected normally closed contacts, operation of one of said switches breaking said serial connection and connecting said fixed potential to said normally open contact of the operated one of said switches; a coding circuit including a diode matrix individually connected to each of said normally open contacts of said switches and providing different coded digital output signals in response to the application of said fixed potential to said normally open contacts of different ones of said switches; a flexible roll chart movably disposed over said keyboard and having a plurality of partial messages thereon and arranged in successive frames of partial messages adapted to register with said switches; a chart drive including a motor mechanically coupled to said chart through an electromagnetic clutch providing selective movement of said chart in either direction over said keyboard to position selected ones of said frames of partial messages over said switches in response to applied electrical signals, said chart having indicia associated with said frames of partial messages thereon; an electrical sensing circuit including a light source and a photoelectric cell disposed adjacent said chart and providing in response to said indicia electrical signals indicative of the position of said frames of partial messages with respect to said keyboard; a sequence selection circuit including a plurality of electromagnetic relays each having a coil individually connected to said matrix and responsive to said digital output signals, said relays including contacts interconnected in a predetermined manner to provide a signal at different points corresponding to the coding of said digital signals and indicative of a selected predetermined sequence of said frame of partial messages representative of the initial operation of a selected one of said switches, a sequence control circuit including electromagnetic relays and a stepping switch connected to provide predetermined stepping sequences, said sequence control circuit being connected to said different points of said sequence selection circuit, to said electromagnetic clutch and to said photoelectric cell and providing signals to said electromagnetic clutch initially in response to said signal at said different points indicative of said selected sequence to position said chart to the first of said frames in said selected sequence, said sequence control circuit applying subsequent signals to said electromagnetic clutch to position said chart to successive ones of said frames in said selected sequence in response to successive ones of said digital output signals as ones of the switches are successively operated, said relays of said sequence control circuit terminating signals to said electromagnetic clutch and applying a release signal to said relays of said sequence selection circuit in response to signals from said photoelectric cell indicating said chart is positioned to the correct ones of said frames of said selected sequence.

3. A digital message generator comprising: a keyboard including a plurality of pushbutton switches and a diode matrix connected to provide different coded digital output signals in response to manual operation of different ones of said switches; a message tape movably disposed over said keyboard and having a plurality of partial massages thereon and arranged in successive frames of partial messages adapted to register over said switches; a tape drive including a motor mechanically coupled to said tape through an electromagnetic clutch providing selective movement of said tape in either direction over said keyboard to position selected ones of said frames of partial messages over said switches in response to applied electrical signals, said tape having indicia associated with said frames of partial messages thereon; an electrical sensing circuit including a light source and a photoelectric cell disposed adjacent said tape and providing in response to said indicia electrical signals indicative of the position of said frames of partial messages with respect to said keyboard; a sequence selection circuit including a plurality of electromagnetic relays each having a coil individually connected to said matrix and responsive to said digital output signals, said relays including contacts interconnected in a predetermined manner to provide a signal at different points corresponding to the coding of said digital signals and indicative of a selected predetermined sequence of said frames of partial messages representative of the initial operation of a selected one of said switches, and a sequence control circuit including electromagnetic relays and a stepping switch connected to provide predetermined stepping sequences, said sequence control circuit being connected to said different points of said sequence selection circuit, to said electromagnetic clutch and to said photoelectric cell and providing signals to said electromagnetic clutch initially in response to said signal indicative of said selected sequence to position said tape to the first of said frames in said selected sequence, said sequence control circuit applying subsequent signals to said electromagnetic clutch to position said tape to successive ones of said frames in said selected sequence as ones of said switches are successively operated, said sequence control circuit ceasing to provide signals to said electromagnetic clutch in response to signals from said photoelectric cell indicating that said tape is positioned to the correct ones of said frames of said selected sequence.

4. A digital message generation system comprising: a keyboard including a plurality of pushbutton switches and a diode matrix connected to provide different coded digital output signals in response to the manual operation of different ones of said switches; a message tape movably disposed over said keyboard and having a plurality of partial messages thereon and arranged in successive frames of partial messages adapted to register over said switches, predetermined sequences of said frames providing partial message choices combining to provide a complete message; a tape drive mechanically coupled to said tape providing selective movement of said tape in either direction over said keyboard in response to applied electrical signals, said tape having indicia associated with said frames of partial messages thereon; an electrical sensing circuit disposed adjacent said tape and providing in response to said indicia electrical signals indicative of the position of said frames of partial messages with respect to said keyboard; a sequence selection circuit connected to said matrix and responsive to said digital output signals to provide a signal at different points corresponding to the coding of said digital signals; a sequence control circuit connected to said different points of said sequence selection circuit, to said tape drive and to said electrical sensing circuit and providing signals to said tape drive initially in response to said signals at said different points of said sequence selection circuit to position said tape to the first of said frames in said selected sequence, said sequence control circuit applying subsequent signals to said tape drive to position said tape to successive ones of said frames in said selected sequence in response to successive ones of said digital output signals as said switches are successively operated, said sequence control circuit terminating signals to said tape drive in response to signals from said electrical sensing circuit indicating said tape is positioned to the correct ones of said frames of said selected sequence.

5. A digital message generation system comprising: a code generating keyboard having a plurality of keys providing a different coded digital output signals in response to the manual operation of different ones of said keys, said keys having changeable visual key designations responsive to applied electrical signals for the changing of said designations, successive changes of said designations forming successive groups of partial messages, predetermined sequences of said groups of designations providing partial message choices combining to provide a complete message; a sequence selection circuit connected to said keyboard and responsive to said digital output signals to provide a signal at different points corresponding to the coding of said digital signals; a sequence control circuit connected to said different points of said sequence selection circuit and to said keyboard and providing signals to said keyboard initially in response to said signals at said different points of said sequence selection circuit to change said key designations to the first group of designations in said selected sequence, said sequence control circuit applying subsequent signals to said keyboard to change said key designations to successive groups of designations in said selected sequence in response to the successive generation of said digital output signals as said keys are successively operated.

6. Apparatus for translating messages into electrical signals comprising: an array of manually selectable members each having a changeable visual designation, the composite of all of said members providing a display of alternative choices of said designations, said designations being changeable as a group to provide successive displays thereof in selectable sequences; designation changing means operatively associated with said members and responsive to successive manual selection thereof for successively changing all of said designations as a group in predetermined sequences, said members initially displaying a choice of said designations corresponding to predetermined message sequences, said designation changing means responding to the initial selection of one of said members corresponding to a selected sequence by changing said designations to the first group of said designations in said selected sequence, said designation changing means thereafter changing said designations to successive groups of said designations in said selected sequence as said members are successively selected; and signal generating means coupled to said members for generating electrical signals coded to correspond to selected ones of said members in response to the manual selection thereof, said electrical signals corresponding to particular message information in accordance with the coding and sequential position of each of said signals.

7. A digital message generation system comprising: a code generating keyboard having a plurality of keys providing different coded digital output signals in response to the manual operation of different ones of said keys, said keys having changeable visual key designations responsive to applied electrical signals for the changing of said designations, successive changes of said designations forming successive groups of partial messages, predetermined sequences of said groups of designations providing partial message choices combining to provide a complete message; and a designation control circuit connected to said keyboard and responsive to the coding of said digital output signals to provide signals to said keyboard initially to change said key designations to the first group of designations in a selected sequence corresponding to the coding of said digital output signal in response to the initial operation of one of said keys, said designation control circuit applying subsequent signals to said keyboard to change said key designations to successive groups of designations in said selected sequence in response to the successive generation of said digital output signals as said keys are successively operated.

8. A digital message generator providing choices of available predetermined message portions in prescribed sequences comprising: a plurality of keys arranged in a keyboard; a plurality of electrical switches operatively coupled to said keys each being operable by the depression of an associated one of said keys; a translucent roll chart movably disposed over said keyboard, said chart having a series of different message portion designations for said keys arranged in frames; a chart drive mechanically engaging said chart and operable to position predetermined frames over said keyboard in response to predetermined control signals; and a control circuit electrically connected to said switches for developing unique digital output signals in response to the operation of said switches and for developing predetermined control signals in response to the operation of predetermined ones of said switches, said control circuit being electrically connected to said chart drive for applying said control signals thereto.

9. Apparatus for translating messages into electrical signals and providing choices of predetermined message portions in prescribed sequences comprising: an array of manually selectable members each having a changeable visual designation identifying a message portion, the composite of all of said designations providing an array of choices of message portions, said designations being changeable as a group to provide successive choices of predetermined message portions in predetermined sequences; designation changing means operatively associated with said members and responsive to manual selection thereof for changing all of said designations as a group in predetermined sequences to provide incremental translation of a complete message; and signal generating means coupled to said members for generating electrical signals coded to correspond to selected ones of said members in response to the manual selection thereof, said electrical signals corresponding to particular message information in accordance with the coding and sequential position of each of said signals.

10. A digital message generator comprising: a code generating keyboard having a plurality of keys and providing different code digital output signals in response to manual operation of different ones of said keys; changeable visual key designations disposed on said keyboard and responsive to applied electrical signals for the changing of said designations; and a designation control circuit connected to said keyboard and responsive to said digital output signals, said designation control circuit initially providing a signal to said keyboard in response to the coding of said digital output signal in response to the initial operation of one of said keys corresponding to a selected sequence to change said key designations to the first group of designations in said selected sequence, said designation control circuit applying subsequent signals to said keyboard to change said key designations to successive groups of designations in said selected sequence as ones of said keys are successively operated.

References Cited by the Examiner

UNITED STATES PATENTS

| | | | |
|---|---|---|---|
| 1,069,582 | 8/13 | Schaefer | 340—286 |
| 2,407,411 | 9/46 | Folis | 340—286 |
| 2,783,454 | 2/57 | North | 340—149 |
| 2,808,579 | 10/57 | McCarthy | 340—286 |
| 2,883,652 | 4/59 | Ireland | 200—167 |

NEIL C. READ, *Primary Examiner.*

JOHN F. BURNS, *Examiner.*